(12) United States Patent
Wu et al.

(10) Patent No.: US 11,886,007 B2
(45) Date of Patent: Jan. 30, 2024

(54) ASYMMETRIC OPTICAL POWER SPLITTING SYSTEM AND METHOD

(71) Applicant: Apple Inc., Cupertino, CA (US)

(72) Inventors: Yi-Kuei Wu, San Jose, CA (US);
Yongming Tu, Redwood City, CA (US);
Alfredo Bismuto, Sunnyvale, CA (US);
Andrea Trita, Pasadena, CA (US);
Yangyang Liu, Pasadena, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/985,615

(22) Filed: Nov. 11, 2022

(65) Prior Publication Data

US 2023/0071329 A1   Mar. 9, 2023

Related U.S. Application Data

(63) Continuation of application No. 17/073,393, filed on Oct. 18, 2020, now Pat. No. 11,500,154.

(Continued)

(51) Int. Cl.
*G02B 6/122* (2006.01)
*G02B 6/12* (2006.01)
*G02B 27/10* (2006.01)

(52) U.S. Cl.
CPC ....... *G02B 6/1228* (2013.01); *G02B 6/12004* (2013.01); *G02B 27/10* (2013.01)

(58) Field of Classification Search
CPC .............. G02B 6/1228; G02B 6/12004; G02B 6/12016; G02B 6/122; G02B 27/10; G02B 27/1006
See application file for complete search history.

(56) References Cited

U.S. PATENT DOCUMENTS 4,934,775 A * 6/1990 Koai ................ H04Q 11/0005
                                                    385/16
5,524,156 A * 6/1996 Van Der Tol .......... G02B 6/125
                                                    385/11
(Continued)

FOREIGN PATENT DOCUMENTS

CN       109445026      12/2000
JP       H04204508       7/1992
(Continued)

OTHER PUBLICATIONS

Dai et al., "10-Channel Mode (de)multiplexer with Dual Polarizations," Laser & Photonics Reviews, vol. 12, No. 1, Nov. 17, 2017, 9 pages.

(Continued)

*Primary Examiner* — Andrew Jordan
(74) *Attorney, Agent, or Firm* — Brownstein Hyatt Farber Schreck, LLP

(57) ABSTRACT

A waveguide structure and a method for splitting light is described. The method may include optically coupling a first waveguide and a second waveguide, where the optical coupling may be wavelength insensitive. The widths of the first and second waveguides may be non-adiabatically varying and the optical coupling may be asymmetric between the first and second waveguides. A gap between the first and second waveguides may also be varied non-adiabatically and the gap may depend on the widths of the first and second waveguides. The optical coupling between the first and second waveguides may also occur in the approximate wavelength range of 800 nanometers to 1700 nanometers.

20 Claims, 9 Drawing Sheets

Related U.S. Application Data

(60) Provisional application No. 62/923,333, filed on Oct. 18, 2019.

(56) References Cited

U.S. PATENT DOCUMENTS

| | | | | |
|---|---|---|---|---|
| 5,544,268 | A * | 8/1996 | Bischel | G09F 9/305 385/16 |
| 5,586,206 | A * | 12/1996 | Brinkman | G11B 7/122 |
| 5,647,036 | A * | 7/1997 | Deacon | G02F 1/29 385/9 |
| 5,652,817 | A * | 7/1997 | Brinkman | G11B 7/1384 |
| 5,664,032 | A * | 9/1997 | Bischel | G02F 1/377 385/16 |
| 5,724,463 | A * | 3/1998 | Deacon | G02F 1/2955 385/47 |
| 5,790,720 | A * | 8/1998 | Marcuse | G02F 1/335 385/11 |
| 5,818,989 | A | 10/1998 | Nakamura | |
| 5,835,458 | A * | 11/1998 | Bischel | G11B 7/1353 369/44.29 |
| 5,911,018 | A * | 6/1999 | Bischel | G09F 9/305 385/11 |
| 5,912,997 | A * | 6/1999 | Bischel | G02F 1/011 385/16 |
| 5,978,524 | A * | 11/1999 | Bischel | G02F 1/377 385/16 |
| 6,014,390 | A * | 1/2000 | Joyner | G02B 6/4215 372/50.1 |
| 6,078,704 | A * | 6/2000 | Bischel | G02F 1/011 385/16 |
| 6,118,908 | A * | 9/2000 | Bischel | G09F 9/305 385/39 |
| 6,141,465 | A * | 10/2000 | Bischel | G09F 9/305 385/16 |
| 6,167,169 | A * | 12/2000 | Brinkman | G02F 1/011 385/16 |
| 6,393,185 | B1 | 5/2002 | Deacon | |
| 6,415,080 | B1 | 7/2002 | Sappey et al. | |
| 6,522,794 | B1 * | 2/2003 | Bischel | G09F 9/305 385/12 |
| 6,674,949 | B2 * | 1/2004 | Allan | G02B 6/125 385/141 |
| 6,842,545 | B2 * | 1/2005 | Lackritz | G02F 1/315 385/16 |
| 6,882,758 | B2 * | 4/2005 | Betty | G02F 1/2257 385/9 |
| 6,903,820 | B2 * | 6/2005 | Wang | G01J 3/021 356/453 |
| 6,934,447 | B2 * | 8/2005 | Kim | G02B 6/1228 385/45 |
| 6,954,568 | B2 | 10/2005 | Liu | |
| 7,031,568 | B2 * | 4/2006 | Ian Laming | G02B 6/1228 374/E17.002 |
| 7,149,387 | B2 | 12/2006 | Balakrishnan et al. | |
| 7,151,635 | B2 | 12/2006 | Bidnyk et al. | |
| 7,263,394 | B2 * | 8/2007 | Wang | G01N 21/4795 600/316 |
| 7,324,195 | B2 | 1/2008 | Packirisamy et al. | |
| 7,327,918 | B2 | 2/2008 | Yamazaki et al. | |
| 7,366,421 | B2 * | 4/2008 | Cho | H04B 10/2581 398/28 |
| 7,595,879 | B2 * | 9/2009 | Wang | G01B 9/02057 356/453 |
| 7,831,298 | B1 * | 11/2010 | Wang | A61B 1/2676 600/478 |
| 7,840,108 | B2 | 11/2010 | Miyadera et al. | |
| 7,876,983 | B2 * | 1/2011 | Doerr | G02B 6/125 385/14 |
| 7,970,458 | B2 * | 6/2011 | Norris | A61B 18/22 600/478 |
| 7,999,938 | B2 * | 8/2011 | Wang | A61B 5/0073 356/477 |
| 8,411,260 | B1 * | 4/2013 | Feng | G02B 6/132 356/73.1 |
| 8,498,681 | B2 * | 7/2013 | Wang | G01N 21/4795 600/316 |
| 9,052,447 | B2 | 6/2015 | Luo et al. | |
| 9,176,282 | B2 | 11/2015 | Pottier | |
| 9,395,494 | B2 | 7/2016 | Krishnamurthi et al. | |
| 9,678,012 | B2 * | 6/2017 | Rothberg | C12Q 1/6869 |
| 9,759,865 | B1 * | 9/2017 | Lin | G02B 6/29344 |
| 9,784,679 | B2 * | 10/2017 | Rothberg | C12Q 1/6869 |
| 9,817,296 | B2 * | 11/2017 | Sharkawy | G02B 6/1225 |
| 9,869,816 | B2 | 1/2018 | Ishikura et al. | |
| 10,126,498 | B1 * | 11/2018 | Ma | G02F 1/011 |
| 10,359,571 | B2 | 7/2019 | Horth | |
| 10,520,672 | B2 * | 12/2019 | Ma | G02B 6/12014 |
| 10,551,567 | B2 | 2/2020 | Wang et al. | |
| 10,578,806 | B2 * | 3/2020 | Lamponi | G02B 6/126 |
| 10,901,148 | B2 * | 1/2021 | Ma | G02B 6/12016 |
| 10,935,726 | B1 | 3/2021 | Lee et al. | |
| 10,976,489 | B2 * | 4/2021 | Jou | G02B 6/12004 |
| 11,022,522 | B2 * | 6/2021 | Piazza | G01M 11/0207 |
| 11,079,542 | B2 * | 8/2021 | Fertig | G02B 6/1225 |
| 11,231,319 | B1 | 1/2022 | Tu et al. | |
| 11,280,960 | B2 * | 3/2022 | Qi | G02F 1/3137 |
| 11,320,720 | B2 * | 5/2022 | Puckett | G02F 1/365 |
| 11,480,731 | B2 * | 10/2022 | Liu | G02B 6/1228 |
| 11,500,154 | B1 | 11/2022 | Tu et al. | |
| 11,506,535 | B1 | 11/2022 | Tu et al. | |
| 11,561,346 | B2 * | 1/2023 | Tu | G02B 6/29328 |
| 11,630,262 | B2 * | 4/2023 | Shin | G01S 7/4818 385/140 |
| 11,644,619 | B2 * | 5/2023 | Qi | G02B 6/12004 385/31 |
| 2002/0021878 | A1 * | 2/2002 | Allan | G02F 1/011 385/144 |
| 2003/0016914 | A1 * | 1/2003 | Kim | G02B 6/1228 385/45 |
| 2003/0048975 | A1 * | 3/2003 | Lackritz | G02F 1/065 385/16 |
| 2003/0091265 | A1 | 5/2003 | Lin et al. | |
| 2003/0133663 | A1 * | 7/2003 | Orignac | G02B 6/125 385/48 |
| 2004/0008965 | A1 * | 1/2004 | Betty | G02F 1/2257 385/140 |
| 2004/0047560 | A1 * | 3/2004 | Laming | G02B 6/12004 374/E17.002 |
| 2004/0218868 | A1 * | 11/2004 | Liu | G02F 1/225 385/45 |
| 2004/0246490 | A1 * | 12/2004 | Wang | G01B 9/02091 356/479 |
| 2005/0075547 | A1 * | 4/2005 | Wang | A61B 5/0066 600/316 |
| 2005/0141899 | A1 * | 6/2005 | Cho | G02B 6/14 385/28 |
| 2006/0079762 | A1 * | 4/2006 | Norris | A61B 1/2676 600/427 |
| 2006/0100490 | A1 * | 5/2006 | Wang | A61B 5/441 600/310 |
| 2007/0103683 | A1 * | 5/2007 | Wang | A61B 5/0059 356/491 |
| 2009/0245719 | A1 * | 10/2009 | Nagarajan | G02B 6/12019 385/14 |
| 2010/0014093 | A1 * | 1/2010 | Wang | G01N 21/27 356/479 |
| 2010/0119195 | A1 * | 5/2010 | Doerr | G02B 6/125 385/15 |
| 2012/0002924 | A1 | 1/2012 | Okayama | |
| 2015/0104130 | A1 * | 4/2015 | Anderson | G02B 6/1228 385/28 |
| 2016/0370291 | A1 * | 12/2016 | Rothberg | C12Q 1/6869 |
| 2016/0370292 | A1 * | 12/2016 | Rothberg | G01N 21/6408 |
| 2017/0023733 | A1 * | 1/2017 | Florjanczyk | G02B 6/12004 |
| 2017/0082908 | A1 * | 3/2017 | Sharkawy | G02B 6/125 |
| 2019/0049665 | A1 * | 2/2019 | Ma | H01L 33/58 |
| 2019/0052063 | A1 | 2/2019 | Tolstikhin | |
| 2019/0310424 | A1 * | 10/2019 | Lamponi | G02B 6/105 |
| 2020/0018898 | A1 * | 1/2020 | Jou | G02B 6/1228 |

(56) References Cited

U.S. PATENT DOCUMENTS

| | | | |
|---|---|---|---|
| 2020/0033228 A1* | 1/2020 | Piazza | G01M 11/335 |
| 2020/0096699 A1* | 3/2020 | Ma | G02B 6/12019 |
| 2020/0284980 A1* | 9/2020 | Qi | G02B 6/12004 |
| 2021/0033789 A1* | 2/2021 | Villafranca Velasco | G02B 5/1809 |
| 2021/0116639 A1* | 4/2021 | Fertig | G02B 6/1225 |
| 2021/0116783 A1* | 4/2021 | Puckett | G02B 6/02066 |
| 2021/0191039 A1* | 6/2021 | Jou | G02B 6/1228 |
| 2021/0270699 A1* | 9/2021 | Piazza | G01M 11/0207 |
| 2021/0364698 A1* | 11/2021 | Liu | G02B 6/1228 |
| 2022/0091338 A1 | 3/2022 | Tu et al. | |
| 2022/0099889 A1 | 3/2022 | Arbore et al. | |
| 2022/0171128 A1* | 6/2022 | Qi | G02B 6/125 |
| 2022/0229234 A1* | 7/2022 | Shin | G02B 6/12016 |
| 2023/0071329 A1* | 3/2023 | Wu | G02B 27/10 |
| 2023/0094833 A1* | 3/2023 | Wu | G02B 6/2935 359/558 |
| 2023/0125733 A1* | 4/2023 | Thomas | G02B 6/136 385/37 |

FOREIGN PATENT DOCUMENTS

| | | |
|---|---|---|
| JP | H063709 | 1/1994 |
| JP | 2006284791 | 10/2006 |
| JP | 2007279240 | 10/2007 |
| JP | 2010223991 | 10/2010 |
| JP | 2015152729 | 8/2015 |
| JP | 2015197664 | 11/2015 |
| JP | 2016148810 | 8/2016 |
| JP | 2018004692 | 1/2018 |

OTHER PUBLICATIONS

Liu et al., "Silicon Multimode Waveguide Grating Filter at 2 μm," Journal of Lightwave Technology, IEEE USA, vol. 37, No. 10, May 15, 2019, pp. 2217-2222.

He et al., "Integrated Polarization Compensator for WDM Waveguide Demultiplexers," *IEEE Photonics Technology Letters* vol. 11, No. 2, Feb. 1999, pp. 224-226.

Krubhakar et al., "Design and fabrication of integrated optical 1×8 power splitter in SOI substrate using large cross-section single-mode waveguides," Photonics 2010: Tenth International Conference on Fiber Optics and Photonics, Proceeding of SPIE, Bellingham, Washington, vol. 8173, No. 1, Dec. 29, 2010, pp. 1-6.

U.S. Appl. No. 17/725,418, filed Apr. 20, 2022, Wu et al.

U.S. Appl. No. 17/832,091, filed Jun. 3, 2022, Wu.

U.S. Appl. No. 17/851,252, filed Jun. 28, 2022, Wu.

U.S. Appl. No. 17/903,875, filed Sep. 6, 2022, Pelc et al.

Dai et al., "Compact silicon-on-insulator-based multimode interference coupler with bilevel taper structure," Applied Optics, Optical Society of America, vol. 44, No. 24, 2005, pp. 5036-5041.

Li et al., "Compact and low-loss silicon power splitter based on inverse tapers," Optics Letters, Optical Society of America, vol. 38, No. 20, 2013, pp. 4220-4223.

Rasigade et al., "Compact wavelength-insensitive fabrication-tolerant silicon-on-insulator beam splitter," Optics Letters, Optical Society of America, vol. 35, No. 21, 2010, pp. 3700-3702.

* cited by examiner

ASYMMETRIC OPTICAL POWER SPLITTING SYSTEM AND METHOD

CROSS-REFERENCE TO RELATED APPLICATIONS

This application is a continuation of U.S. patent application Ser. No. 17/073,393, filed Oct. 18, 2020, which is a nonprovisional of and claims the benefit under 35 U.S.C. § 119(e) of U.S. Provisional Patent Application No. 62/923,333, filed Oct. 18, 2019, the contents of which are incorporated herein by reference as if fully disclosed herein.

FIELD

Some of the described embodiments relate generally to optical systems with light emitting components and more specifically to asymmetrically splitting optical power between multiple waveguides.

BACKGROUND

Optical splitters may split such light to facilitate operation of the optical system. Optical splitters may be used to provide multiple outputs from an optical system and/or to split light in order to enable various operations within an optical system. An optical splitter might split light to facilitate control of one or more components within the optical system, such as controlling a power output from the system, to provide simultaneous transmission of data to multiple destinations, as in a point-to-multipoint network, for feedback or feedforward control of an optical system or components therein, and so on.

Optical splitters may reduce the amount of light provided to components of the optical system. Additionally, the splitting components are highly sensitive to wavelength changes and function over a very limited and narrow wavelength range.

SUMMARY

Embodiments of the systems, devices, methods, and apparatus described in the present disclosure are directed to a waveguide structure for asymmetrically splitting optical power over a broad wavelength range while remaining wavelength insensitive. Also described are systems, devices, methods, directed to splitting optical power by non-adiabatically coupling waveguides to one another and varying the widths of waveguides to achieve the desired optical power split.

In some examples, the present disclosure describes a light guiding device which may include: a first waveguide optically coupled to and located between a first portion of a second waveguide and a first portion of a third waveguide, wherein the optical coupling is wavelength insensitive; a second portion of the second waveguide, optically coupled to and separated by a first gap from a second portion of the third waveguide, wherein the second portion of the second waveguide and the second portion of the third waveguide are unequal in width; and a third portion of the second waveguide optically decoupled from a third portion of the third waveguide, wherein the third portion of the second waveguide and the third portion of the third waveguide are separated by a second gap. In some examples, the width of the second portion of the second waveguide may increase in width and the second portion of the third waveguide may decrease in width. In some examples, the optical coupling may occur over a wavelength range of 800 nanometers to 1700 nanometers. In some examples, the width of the second portion of the second waveguide and the width of the second portion of the third waveguide may vary non-adiabatically. In still further examples, the walls of the second waveguide may be nonlinear and the walls of the third waveguide may be nonlinear. In some examples, the present disclosure describes an optical system that comprises an optical splitter. The optical splitter comprises an input waveguide, a first waveguide, and a second waveguide, wherein: i) the optical splitter includes a first section in which the input waveguide is optically coupled to the first waveguide and the second waveguide; ii) the optical splitter includes a second section in which the first waveguide is optically coupled to the second waveguide; and iii) the first waveguide and the second waveguide are configured in the second section to propagate different modes.

In some examples, the present disclosure describes a method for asymmetrically splitting optical power, which may include: optically coupling a first waveguide to a second waveguide and a third waveguide, in a section of a waveguide structure, where the optical coupling may be wavelength insensitive; non-adiabatically varying a width of the second waveguide and non-adiabatically varying a width of the third waveguide; where a first portion of optical power couples from the first waveguide to the second waveguide and a second portion of optical power couples from the first waveguide to the third waveguide and the first portion and the second portion of optical power are different. In some examples, the method may include varying a width of a gap between the second waveguide and the third waveguide in the section of the waveguide structure, based at least in part on the width of the second waveguide and the width of the third waveguide. In some examples, the optical coupling may occur over a wavelength range of 800 nanometers to 1700 nanometers. In some examples, the width of the second waveguide may be increased and the width of the third waveguide may be decreased in the section of the waveguide structure.

In some examples, the method may further include one or more of the following: optically decoupling the second waveguide and the third waveguide in a second section of the waveguide structure, varying a width of a gap between the second waveguide and the third waveguide, in a second section of the waveguide structure, to optically decouple the second waveguide from the third waveguide, and/or controlling an amount of power coupled from the first waveguide to the second waveguide and the third waveguide by varying the widths of the second waveguide and the third waveguide. In some examples, the first portion of optical power may be approximately 90 percent of the optical power of the first waveguide and the second portion of optical power is approximately 10 percent of the optical power of the first waveguide.

In some examples, the present disclosure describes a method of splitting optical power, which may include optically coupling a first waveguide to a second waveguide and a third waveguide, in a first section of a waveguide structure; varying a first width of the second waveguide and varying a first width of the third waveguide, in a second section of the waveguide structure, to optically couple the second waveguide with the third waveguide; and varying a gap between the second waveguide and the third waveguide, in a third section of the waveguide structure, to optically decouple the second waveguide from the third waveguide. In some examples, the method may further include non-adiabatically varying the widths of the optically coupled second waveguide and third waveguide. In some examples, non-adiabatically varying the widths of the optically coupled second waveguide and third waveguide may include optically coupling optical power from the second waveguide to the third waveguide.

In still further examples, the method may include adiabatically tapering the first waveguide to couple the first waveguide to the second waveguide and the third waveguide. In some examples, optically coupling the first waveguide to the second waveguide and the third waveguide in the first section of the waveguide structure may include splitting the optical power from the first waveguide symmetrically between the second waveguide and the third waveguide. In some examples, the method may include varying a width of the gap between the second waveguide and the third waveguide, based at least in part on the first width of the second waveguide and the first width of the third waveguide.

In some examples, the present disclosure describes an optical power splitting device, which may include a tapered input waveguide optically coupled to a waveguide pair in a first section of the optical power splitting device, where the optical coupling is wavelength insensitive; a first waveguide of the waveguide pair non-adiabatically tapered and optically coupled to the tapered input waveguide; and a second waveguide of the waveguide pair non-adiabatically tapered and optically coupled to the tapered input waveguide; where a first quantity of optical power from the tapered input waveguide is coupled to the first waveguide of the waveguide pair and a second quantity of optical power from the tapered input waveguide is coupled to the second waveguide of the waveguide pair and the first quantity of optical power is different from the second quantity of optical power and a difference between the first and second quantity of optical power is based at least in part on a width of the first waveguide of the waveguide pair and a width of the second waveguide of the waveguide pair. In some examples, the first quantity of optical power is 80 percent of the optical power from the tapered input waveguide and the second quantity of optical power is 20 percent of the optical power from the tapered input waveguide. In still further examples, the optical coupling may occur over a wavelength range of 800 nanometers to 1700 nanometers.

In addition to the example aspects and embodiments described herein, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
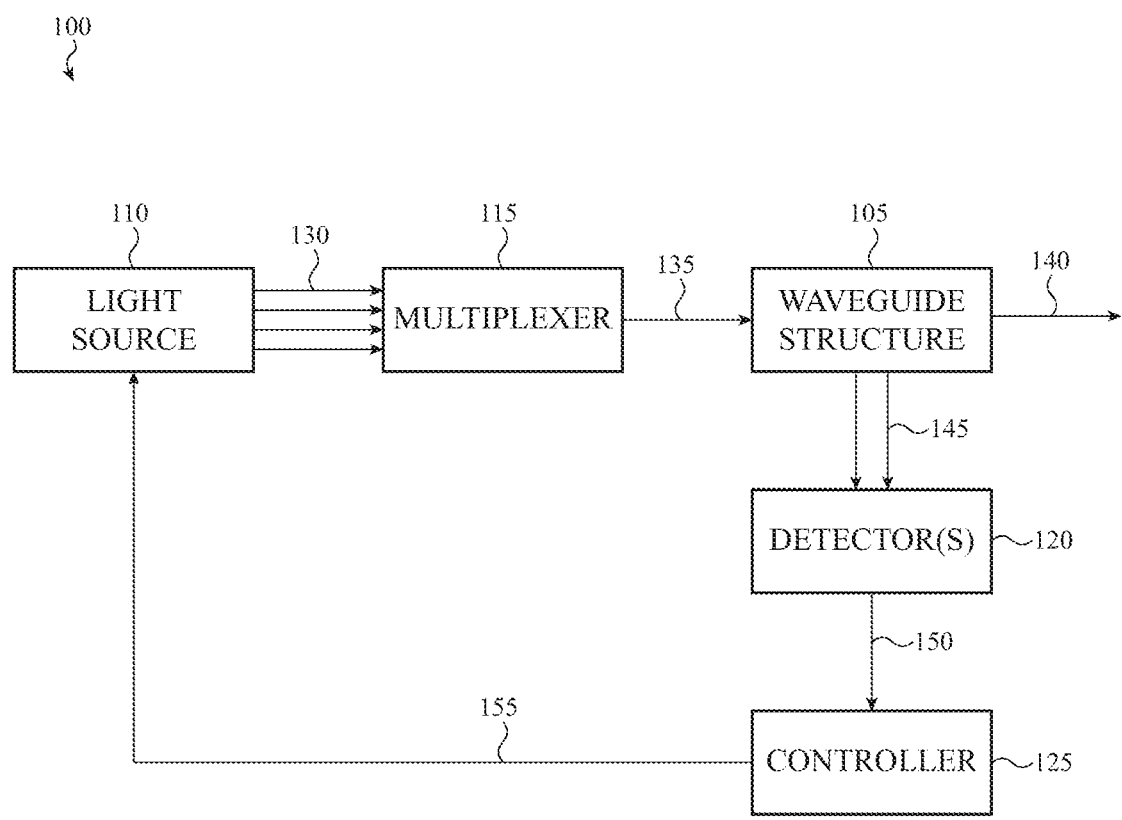
FIG. 1 illustrates a block diagram of an example optical system, which can include a waveguide structure that asymmetrically splits optical power.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Many optical systems may include a light source with one or more light emitters. The light emitters may emit light with various properties such as intensity, wavelength, frequency, and so forth. Optical splitters may split such light to facilitate operation of the optical system. Optical splitters may be used to provide multiple outputs from an optical system and/or to split light in order to enable various operations within an optical system. An optical splitter might split light to facilitate control of one or more components within the optical system, such as controlling a power output from the system, to provide simultaneous transmission of data to multiple destinations, as in a point-to-multipoint network, for feedback or feedforward control of an optical system or components therein, and so on.

As one example, one or more properties of light emitters in an optical system may drift over time due to varying conditions, such as temperature, driving current, general aging of the light emitters, and so forth. Light properties may be monitored using one or more monitoring components that receive a portion of the light split off from the emitted light. By monitoring the property (or properties) of the light, the optical system may correct for light emitter drift. Light may be split by an optical splitter in the optical system in order to provide the split light to a monitoring component.

The light may be split by ratio tapping components, which split optical power. The light may be split by using components, such as ratio tapping components, that split optical power (e.g., by using optical coupling) from an input waveguide into two separate output waveguides. In some prior solutions, the split ratio may be 50:50 between each of the output waveguides and in some cases may be 0:100, but other split ratios such as 80:20 may not be achieved.

In some prior solutions, the ratio tapping components (or other monitoring components) may be capable of achieving an arbitrary splitting ratio, but may be very sensitive to wavelength change. Some monitoring components may be capable of optically splitting power over a wide range of wavelengths, but their splitting ratio is fixed at 50:50. In further prior solutions, some monitoring components may be capable of arbitrarily splitting optical power, but the wavelength range over which they may perform the optical splitting is very narrow and may only be 100 nanometers or less. In still further prior solutions, multiple monitoring components may be used together, but may not be compatible with optical platforms with a relatively large feature size, for example one to two microns.

By contrast and as discussed herein, certain waveguide structures may have an asymmetric optical power splitting ratio which may operate over a large wavelength range such as 800 nanometers to 1700 nanometers and may be relatively wavelength insensitive when compared to, for example, directional couplers. Further, the waveguide structure discussed herein may be fabricated for silicon photonics optical platforms which employ a large minimum feature size such as one to three microns or so. In some examples, the waveguide structure may employ silicon waveguides or silicon-on-insulator waveguides for use in silicon photonics systems. Additionally, certain embodiments discussed herein may achieve practically any split ration from 0:100 to 100:0.

In some examples, in a first section of the waveguide structure, an input waveguide may be adiabatically tapered and coupled to a first waveguide and a second waveguide, where the fundamental mode in a first section may propagate and convert into a symmetric supermode. Further, the input waveguide may be adiabatically tapered so that the local first-order mode of the input waveguide may propagate through the taper while undergoing relatively few mode conversions to higher-order modes.

In a second section of the waveguide structure, the input waveguide may couple to the first and the second waveguides so that each of the first and second waveguides may receive approximately 50 percent of the light from the input waveguide in a 50:50 optical power split. In a third section, the first waveguide may be coupled to the second waveguide so that a designed fraction of optical power may couple between the two waveguides. In the third section, the widths of the first and second waveguides and the gap between the two waveguides may be varied non-adiabatically which may allow asymmetric optical power coupling between the two waveguides. The widths of the first and second waveguides and the gap between the two waveguides may vary so that the designed fraction of power may couple from the symmetric supermode to the antisymmetric supermode. The optical coupling may be wavelength insensitive and the waveguide may operate over a broad wavelength range such as in the approximate wavelength range of 750 nanometers to 1750 nanometers. In a fourth region, the gap between the first and second waveguides may increase so that the first and second waveguides become decoupled from one another and the symmetric and antisymmetric supermodes adiabatically change into the fundamental modes of the decoupled first and second waveguides.

Described herein are various configurations for using optical elements, such as waveguides, to monitor one or more properties of light emitting components in optical systems. In some embodiments, the waveguides may split off part of the light from the light emitting components to monitor for drift, while maintaining wavelength insensitivity in the coupling between the waveguides over a broad wavelength range.

As used herein, the term "abutting" means that two elements share a common boundary or otherwise contact one another, while the term "adjacent" means that two elements are near one another and may (or may not) contact one another. Thus, elements that are abutting are also adjacent, although the reverse is not necessarily true. Two elements that are "coupled to" one another may be permanently or removably physically coupled to one another and/or operationally or functionally coupled to one another. Additionally, two elements that are "optically coupled" to one another may allow light to pass from one element to the other element.

These and other embodiments are discussed below with reference to FIGS. 1-9. However, those skilled in the art will readily appreciate that the detailed description given herein with respect to these figures is for explanatory purposes only and should not be construed as limiting.

FIG. 1 illustrates a block diagram of an example optical system, which can include a waveguide structure that asymmetrically splits optical power. In some examples, the optical system 100 may include a light source 110, a multiplexer 115, a waveguide structure 105, a detector 120, and a controller 125. In some examples of FIG. 1, monitoring the optical properties of emitted light may employ the use of the optical system 100. The optical system may be used to verify whether the light sources are emitting a target wavelength and/or have a certain amount of wavelength stability and, in some examples, make adjustments accordingly. The optical system 100 may be configured with one or more functions: multiplexing, combining, selecting, filtering, or any combination thereof, and so forth. In some examples, the number of components in the optical system 100 may include fewer or more components.

In FIG. 1, the optical system 100 may include one or more light sources 110 and a multiplexer 115. The light sources 110 can be configured to emit light along one or more light paths 130. In some examples, the light sources 110 can be configured to emit light having different ranges of wavelengths. In some examples, the light sources 110 may emit in the approximate wavelength range of 800 nanometers to 1600 nanometers.

The light paths 130 can be input into the multiplexer 115 which may receive the emitted light along the light path(s) 130 and can combine the emitted light to output light path 135. The light path 135 can be input to the waveguide structure 105. The waveguide structure 105 may select and output the light on light path 140, which can be one of the outputs of the optical system 100. The waveguide structure 105 may also generate outputs along the light paths 145 to the detector(s) 120. Although two light paths 145 are depicted in FIG. 1, the waveguide structure 105 may output more than two light paths 145. Similarly, even though one detector is depicted in FIG. 1, multiple detectors 120 may receive light on multiple light paths 145 from the waveguide structure 105.

In FIG. 1, the detector 120 may receive the light paths 140 and output a signal or signals to a controller 125. Even though the detector 120 illustrates a combined, single output to the controller 125, in some examples, an individual output from one or more of the detectors 120 may be output to the controller 125 such that the controller receives an output from a first detector 120 and an output from a second detector (not shown in FIG. 1).

The waveguide structure may be a component that receives light on an input light path via an input waveguide, splits light from the input waveguide between two waveguides, and outputs the split light. In some examples, the waveguide structure may output multiple light paths, which may include at least a first light path with a first portion of the input optical power and a second light path with a second portion of input optical power. The splitting of the optical power by the waveguide structure will be discussed in further detail in at least FIGS. 2-4. Further, the waveguide structure discussed herein may be fabricated for silicon photonics optical platforms which employ a large minimum feature size such as one to three microns or so. In some examples, the waveguide structure may include silicon waveguides or silicon-on-insulator waveguides for use in silicon photonics systems.

In some examples, the waveguide structure 105 may receive light on the light path 135 as an input and can output light along light paths 140 and 145. The waveguide structure 105 may include an input waveguide (not illustrated in FIG. 1) and at least a first waveguide and a second waveguide (the first and second waveguides not illustrated in FIG. 1). The light received via the input waveguide may be asymmetrically split between the first and second waveguides over a very wide wavelength range and while remaining relatively wavelength insensitive. In some examples, the light may be split and/or optically coupled from one waveguide to another regardless of the wavelength. That is, approximately the same amount of power may be split or coupled in the wavelength range of approximately 700 nanometers to 1700 nanometers and the amount of light that is split or coupled may not noticeably vary even though the light may be one or more wavelengths. Thus, wavelength insensitivity may provide stable power splitting or optical coupling even though the light wavelength may vary within a range. Furthermore, the amount of power split between the waveguides may not vary when the wavelength is within or around the approximate range of 700 nanometers to 1700 nanometers, however, outside of this 700 to 1700 nanometer wavelength range, the power split or optical coupling may vary, but the waveguide structure may still be wavelength insensitive. By splitting the optical power using the waveguide structure 105 asymmetrically, the optical system may output more optical power via output light path 140 and may provide significantly less optical power via output light path 145 to the detector 120. The asymmetrical split of light may allow a significant reduction in the amount of optical power lost to the optical system 100 for monitoring the properties of light source 110. In some examples, 90 percent of the input optical power may be output via output light path 140 and ten percent of the input optical power may be output to the detector, thus losing ten percent of the input optical power in the optical system 100. In some examples, the split of optical power may be 80 percent via the output light path 140 and 20 percent may be output to the detector 120. The configuration of the input waveguide and the first and second waveguides will be discussed in further detail in at least FIGS. 2-4.

In FIG. 1, the detector 120 can include any type of diode that can respond to or measure photons impinging on its active area. The detector 120 may generate one or more signals indicative of the light along the light paths 145. In some examples of FIG. 1, these one or more signals may be an output signal or output signals to the controller 125.

Although FIG. 1 illustrates the multiplexer 115 as included in the optical system 100, other examples may include the multiplexer 115 as being a component separate from the optical system 100 (not shown in FIG. 1). Examples of the optical system 100 can further include one or more additional components, such as filters, amplifiers, analog-to-digital converters (ADCs), etc. (not shown) located between the detector(s) 120 and the controller 125. These additional components can perform one or more operations on or with the signals from the detector(s) 120 such as processing the signals, amplifying the signals, performing one or more calculations or comparisons, and so forth.

In some examples, the signal(s) from the optical system 100 may be used as feedback in a control loop. As illustrated in FIG. 1, the optical system 100 may also include a controller 125 that may receive and analyze the signal(s) from the detector(s) 120 along path 150. The controller 125 may generate one or more signals that may be inputs to the light source 110 along path 155. In some examples, the analysis by the controller 125 may include monitoring the wavelength of the emitted light as discussed herein and determining the difference between the monitored wavelength and a target wavelength. The controller 125 may be configured to provide a signal to the light source 110 via path 155, and the signal may be employed to lock the monitored wavelength to a target wavelength.

The signal(s) from the controller 125 may be used to control the light source 110 (e.g., control signal(s) transmitted to the light source 110 via path 155) and the properties of light emitted by the light source 110 along the light paths 130. In some examples, the signal(s) from the controller 125 can be indicative of changes in one or more properties (e.g., temperature, current, etc.) of the light source 110. The changes may be associated with locking the monitored wavelength to the target wavelength. In some examples, the controller 125 can use other information (e.g., measured temperature of the light source 110) in generating the signal(s).

The controller 125 may lock the monitored wavelength to the target wavelength, and if the monitored wavelength is not within a certain threshold wavelength from the target wavelength, the controller 125 can adjust or send a new signal to the light source 110. In some examples, the controller 125 may transmit the new signal to another controller (not illustrated in FIG. 1) that controls the light source 110.

In some instances, the light source 110 may emit light from at least two of the light sources at different times. For example, the individual lights of the light source 110 may be activated sequentially or one at a time. The optical system 100 may monitor the wavelength of the emitted light, and the controller 125 may adjust the individual signals to one or more light sources. Alternatively, the controller 125 may receive signals from the detectors sequentially, and the controller 125 may adjust the signals to the light sources in response to the sequentially received, multiple signals from the detectors 120.

Figure 2:
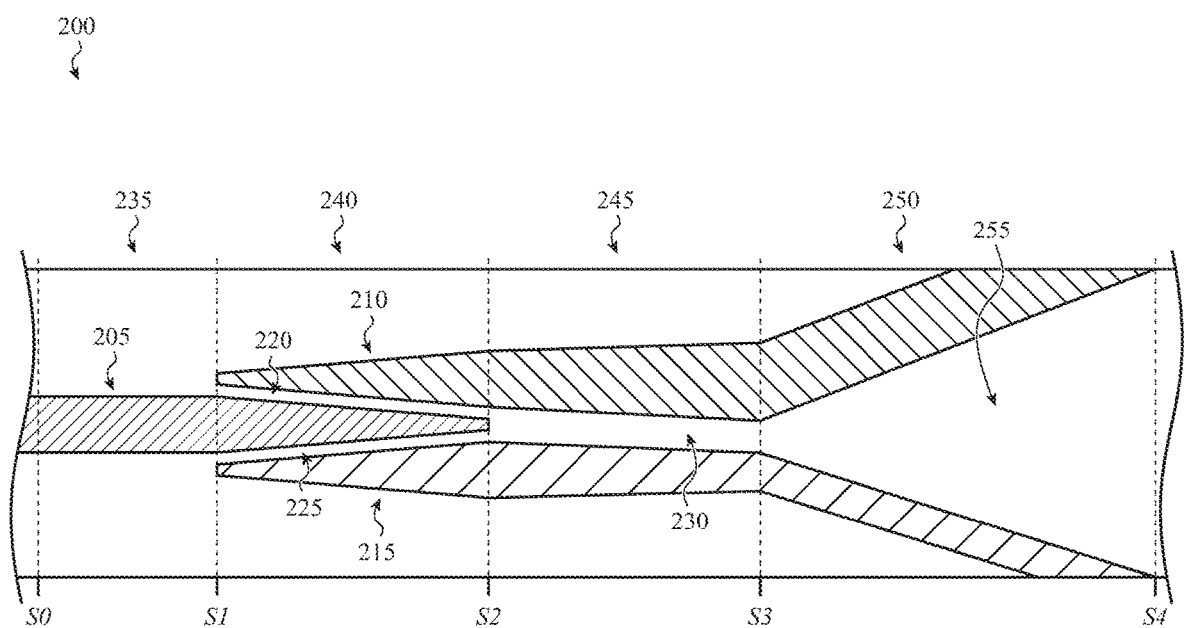
FIG. 2 illustrates an example layout of a waveguide system.

FIG. 2 illustrates an example layout of a waveguide system. In some examples, the waveguide system 200 may include an input waveguide 205, a first waveguide 210, a second waveguide 215, a first gap 220, a second gap 225, a third gap 230, and a fourth gap 255. The input waveguide, the first waveguide, the second waveguide, and the corresponding gaps between the waveguides may be included in the waveguide structure 105 described in FIG. 1. Additionally in FIG. 2, the waveguide system 200 may include a first section 235 extending between S0 and S1, a second section 240 extending between S1 and S2, a third section 245 extending between S2 and S3, and a fourth section 250 between S3 and S4. There may be fewer or more sections in the waveguide system as will be discussed in further detail herein with respect to at least FIGS. 3 and 4. In FIG. 2, the elements are not drawn to scale and may be thicker or thinner than depicted or spaced apart by varying gap widths as described herein at least with respect to FIGS. 2-4. The S0 and the S4 lines as used herein, indicate start and termination points of the first section and the last section, respectively, and are not indicative of termination of the input waveguide, the first waveguide or the second waveguide. Additionally, the cladding is illustrated as a rectangle and in cross-section but is not cross-hatched for clarity. Further, the waveguides may be positioned above a substrate, but the exposed portion of the waveguides may be less than depicted in the cross-sectional views of the figures.

As illustrated in FIG. 2, in the first section 235, the input waveguide 205 may depict input light entering the waveguide system 200 and in some examples, the input waveguide 205 may be a single input waveguide. In some examples, the light in the input waveguide 205 may be received via the light path 135 and from the multiplexer 115 of FIG. 1 or from the light source 110 of FIG. 1. In the first section 235, the input waveguide 205 may be configured to reduce optical power loss, thus in some examples and as shown in FIG. 1, the input waveguide 205 may not be tapered. Generally, one of the approaches to arbitrary ratio tapping via waveguides is available using CMOS processing technology. In CMOS technology, 600 nanometers is a large minimum feature size. A second approach to arbitrary ratio tapping via waveguides is using larger minimum feature sizes of approximately one micron and this approach will be discussed in further detail herein with respect to FIGS. 2-7.

In the first section 235, the input end of the input waveguide 205 and at S0 may be in the approximate size range of two-three microns and, in some examples, may be approximately 2.6 microns. The received light may include light with multiple wavelengths with a broad range such as in the approximate wavelength range of 800 nanometers to 1600 nanometers or in some cases in the approximate wavelength range of 700 nanometers to 1800 nanometers. Although the input waveguide 205 may be depicted as having linear walls or edges, the input waveguide 205 may have any type of nonlinear walls such as, but not limited to, curved, sinusoidal, and so forth. The taper of the input waveguide 205 in first section 235 of the waveguide system 200 may be configured so that little to no optical loss may occur in the first section. In some examples, the portion of the input waveguide 205 in the first section 235 may be referred to herein as a first portion or a first section of the input waveguide 205.

The second section 240 of the waveguide system 200 may include the input waveguide 205, the first waveguide 210, and the second waveguide 215. As depicted in FIG. 2, a second portion of the input waveguide 205 may be spaced apart from the first waveguide 210 by a first gap 220 and the input waveguide 205 may be optically coupled to the first waveguide 210. Similarly, the second portion of the input waveguide 205 may be spaced apart from the second waveguide 215 by a second gap 225 and the input waveguide 205 may be optically coupled to the second waveguide 215 as well.

The input waveguide 205 may be tapered in the second section 240 of the waveguide system 200. Further, the input waveguide 205 may be adiabatically tapered so that the local first-order mode of the input waveguide 205 may propagate through the taper while undergoing relatively few mode conversions to higher-order modes. The input waveguide 205 may taper from a consistent width at S1 in the first section 235 of the waveguide system 200 to a minimum feature size at S2 in the second section 240. In some examples, the minimum features size may be less than approximately one micron. Additionally, the input waveguide 205 may be optically coupled to the first waveguide 210 and the second waveguide 215.

As illustrated in FIG. 2, the first waveguide 210 and the second waveguide 215 may also be tapered similarly to one another. In some examples, the first waveguide 210 and the second waveguide 215 may not be tapered similarly to one another as will be discussed in further detail herein with respect to at least FIGS. 2-4. The first waveguide 210 and the second waveguide 215 may both have the minimum feature size width, at S1 and in the second section 240, which may be the same approximate minimum feature size at the end of the input waveguide 205 at S2. The first waveguide 210 and the second waveguide 215 may be separated from the input waveguide 205 by gaps 220, and 225, respectively. In the second section 240 of the waveguide system 200, the gaps 220 and 225 may approximately the same width. In some examples, the widths of these gaps may vary as will be discussed in further detail herein with respect to at least FIGS. 2-4.

In the second section 240, the input waveguide 205 may couple to the first waveguide 210 and the second waveguide 215 so that each of the first and second waveguides may receive approximately 50 percent of the light from the input waveguide 205. In FIG. 2, an ideal optical system with no optical losses is assumed for discussion purposes. In some examples, where a physical optical system is built with physical optical components, optical losses may occur throughout the system due to propagation losses, general optical leaking, and so forth, thus less than 50 percent of the optical power may be coupled from the input waveguide 205 to the first waveguide 210 and the second waveguide 215, but the coupled optical power may be approximately symmetrically coupled between the first and second waveguides. Although the first and second waveguides and the corresponding gaps are depicted as symmetric in the second section 240 of the waveguide system 200, the first and second waveguides may be asymmetrically tapered with different size gaps so long as approximately 50 percent of the light from the input waveguide 205 is split between the first waveguide and the second waveguide at S2.

As illustrated in the third section 245 and from S2 to S3, the first waveguide 210 may have a different taper than the second waveguide 215. At S3, the width of the first waveguide 210 may be greater than the width of the second waveguide 215. In the third section 245, the first waveguide 210 may be optically coupled to the second waveguide 215 so that a designed fraction of optical power may couple between the two waveguides. In the third section 245, the widths of the first and second waveguides and the gap 230 between the two waveguides may be varied non-adiabatically which may allow asymmetric optical power coupling between the two waveguides.

Although the walls or sides of the first and second waveguides are depicted as linear, the walls or sides of the two waveguides may be nonlinear, curved, sinusoidal, or any profile so long as the widths of the two waveguides allow for asymmetric optical power coupling. Similarly, the gap 230 is depicted as a consistent gap between S2 and S3 in the third section 245, but the gap may vary in width within the third section 245, so long as the gap 230 allows for the first waveguide 210 and the second waveguide 215 to asymmetrically couple optical power between the two waveguides. Additionally, the widths of the first and second waveguides and the width of gap 230 may be selected to produce a flat response versus wavelength, or to produce wavelength insensitive coupling between the first waveguide 210 and the second waveguide 215.

Further, in the third section 245, the distance S2 to S3 may be selected based at least partially on that coupling being a periodic event. For example, once the light is appropriately coupled from the second waveguide 215 to the first waveguide 210 (e.g., approximately 80 percent of the light is in the first waveguide 210 and 20 percent of the light is in the second waveguide 215), the distance between S2 and S3 may be selected so that the light from the second waveguide 215 may not couple back to the first waveguide 210.

In the third section 245 of FIG. 2, the first waveguide 210 and the second waveguide 215 may be coupled to one another and the widths of the first waveguide 210 and the second waveguide 215 and the gap 230 therebetween may be varied non-adiabatically so that a designed fraction may couple from the symmetric supermode to the antisymmetric supermode while maintaining wavelength insensitivity. At S3 of the third section 245, the first waveguide 210 may be at a symmetric supermode and the second waveguide 215 may be at an antisymmetric supermode. In some examples, the symmetric supermode of the first waveguide 210 and the antisymmetric supermode of the second waveguide 215 may be achieved without coupling fifty percent of the optical power into each of the first and second waveguides as described in this example of FIG. 2. The asymmetric coupling into the first waveguide 210 and the second waveguide 215 may be achieved by coupling directly from the input waveguide 205 to the first waveguide 210 and the second waveguide 215 as opposed to coupling the first waveguide 210 and the second waveguide 215 with one another as will be discussed in further detail herein and with respect to at least FIGS. 2-4.

In the fourth section 250 in FIG. 2, the first waveguide 210 and the second waveguide 215 may become optically decoupled from one another. As depicted in the fourth section 250, the gap 255 may gradually increase from S3 to S4 to optically decouple the first waveguide 210 from the second waveguide 215. In the example of FIG. 2, the symmetric supermode and the antisymmetric supermode at S3 may adiabatically evolve into the fundamental modes of the decoupled first waveguide 210 and the second waveguide 215 at S4.

Figure 3:
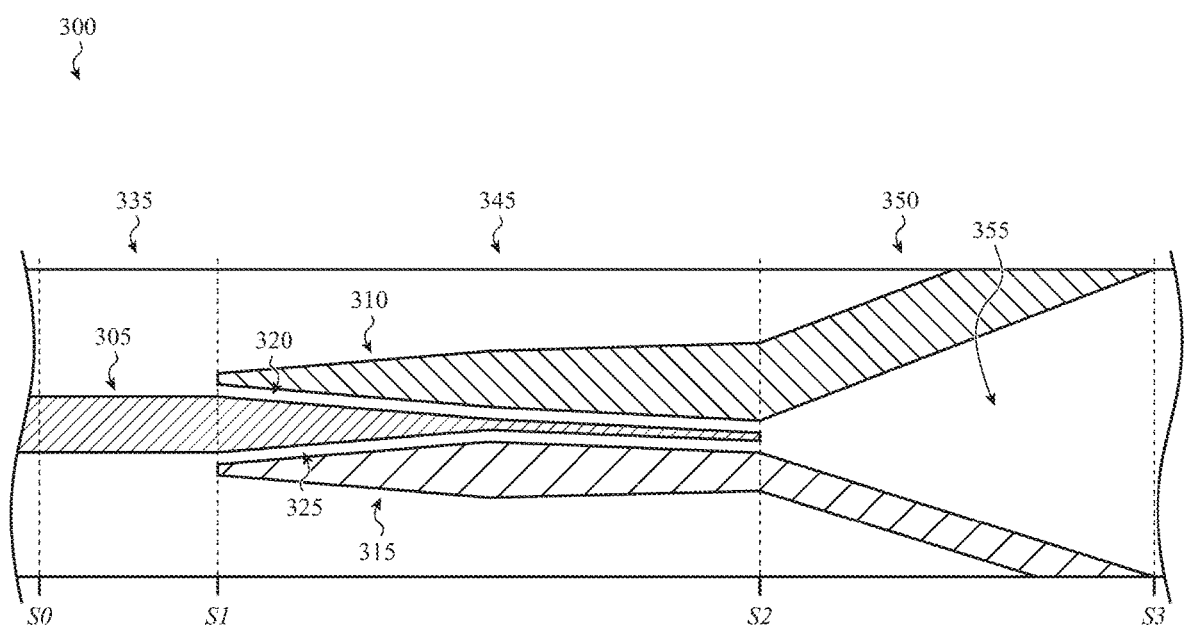
FIG. 3 illustrates another example layout of a waveguide system.

FIG. 3 illustrates an example layout of a waveguide system. In some examples, the waveguide system 300 may include an input waveguide 305, a first waveguide 310, a second waveguide 315, a first gap 320 a second gap 325, and a third gap 355. The input waveguide, the first waveguide, the second waveguide, and the corresponding gaps between the waveguides may be included in the waveguide structure 105 described in FIG. 1. Additionally in FIG. 3, the waveguide system 300 may include a first section 335 extending between S0 and S1, a second section 345 extending between S1 and S2, and a third section 350 extending between S2 and S3. There may be fewer or more sections in the waveguide system as will be discussed in further detail herein with respect to at least FIGS. 2-4. In FIG. 3, some of the waveguide elements and gaps of the waveguide system 300 are similarly numbered such as the input waveguide 305 of FIG. 3 and the input waveguide 205 of FIG. 2 and in some examples may share similar properties. In FIG. 3, the elements are not drawn to scale and may be thicker or thinner than depicted or spaced apart by varying gap widths as described herein at least with respect to FIGS. 2-4. Further, the end of the input waveguide 305 at S2 is depicted as smaller than the end of the first waveguide and the end of the second waveguide at S1, but may be the same size or larger than the end of the first waveguide and the end of the second waveguide at S1. The S0 and the S3 lines as used herein, indicate start and termination points of the first section and the last section, respectively, and are not indicative of termination of the input waveguide, the first waveguide or the second waveguide.

Similar to FIG. 2 and as illustrated in FIG. 3, in the first section 335 of the waveguide system 300, the input waveguide 305 may receive input light entering the waveguide system 300 and, in some examples, the input waveguide 305 may be a single input waveguide. In the first section 335, the input waveguide 305 may be configured to reduce optical power loss, thus in some examples and as shown in FIG. 3, the input waveguide 305 may not be substantially tapered. Similar to the input waveguide 205 of FIG. 2, the approximate size range of the input end of the input waveguide 305 may be in the approximate range of two-three microns and, in some examples, may be approximately 2.6 microns. The received light may include light with multiple wavelengths with a broad range such as in the approximate wavelength range of 800 nanometers to 1600 nanometers. Although the input waveguide 305 may be depicted as having linear walls or edges, the input waveguide 305 may have any type of nonlinear walls such as, but not limited to, curved, sinusoidal, and so forth. The taper of the input waveguide 305 in the first section 335 of the waveguide system 300 may be configured so that little to no optical loss may occur in the first section.

As illustrated in FIG. 3 and different from FIG. 2, there may not be a section of the waveguide system 300 where the input waveguide 305 couples approximately 50 percent of the light to each of the first waveguide 310 and the second waveguide 315. Additionally and alternatively in FIG. 3, in the second section 345 and from S1 to S2, the first waveguide 310 may have a different taper than the second waveguide 315. At S2, the width of the first waveguide 310 may be greater than the width of the second waveguide 315. In the second section 345 the input waveguide 305 may be optically coupled to each of the first waveguide 310 and the second waveguide 315 so that a designed fraction of optical power may couple from the input waveguide 305 to the first waveguide 310 and the second waveguide 315. In the second section 345, the widths of the first and second waveguides and the widths of gaps 320 and 325 between the input waveguide 305 and the two waveguides may be varied non-adiabatically which may allow asymmetric optical power coupling from the input waveguide 305 to the first waveguide 310 and the second waveguide 315.

Although the walls or sides of the first and second waveguide are depicted as linear, the walls or sides of the two waveguides may be nonlinear, curved, sinusoidal, or any profile so long as the widths of the two waveguides allow for asymmetric optical power coupling. Similarly, the gap 320 and the gap 325 are depicted as a consistent gap between S1 and S2 in the second section 345, but the gaps may vary in width within the second section 345, so long as the gap 320 and the gap 325 allow for the input waveguide 305 to asymmetrically couple optical power to the first waveguide 310 and to the second waveguide 315. Similar to FIG. 2, in FIG. 3, the widths of the first and second waveguides and the width of the gaps 320 and 325 may be selected to produce a flat response versus wavelength, or to produce wavelength insensitive coupling from the input waveguide 305 to the first waveguide 310 and the second waveguide 315.

In the second section 345 of FIG. 3, the width of the first waveguide 310 and the width of the second waveguide 315 may vary non-adiabatically so that a designed fraction may couple from the symmetric supermode to the antisymmetric supermode while maintaining wavelength insensitivity. At S2 of the second section 345, the first waveguide 310 may be at a symmetric supermode and the second waveguide 315 may be at an antisymmetric supermode. The asymmetric coupling into the first waveguide 310 and the second waveguide 315 may be achieved by coupling directly from the input waveguide 305 to the first waveguide 310 and the second waveguide 315 as opposed to coupling the first waveguide 210 and the second waveguide 215 with one another as discussed in FIG. 2.

In the third section 350 in FIG. 3, the first waveguide 310 and the second waveguide 315 may become optically decoupled from one another. As depicted in the third section 350, the gap 355 may gradually increase from S2 to S3 to optically decouple the first waveguide 310 from the second waveguide 315. In the example of FIG. 3, the symmetric supermode and the antisymmetric supermode at S2 may adiabatically evolve into the fundamental modes of the decoupled first waveguide 310 and the second waveguide 315 at S3.

Figure 4:
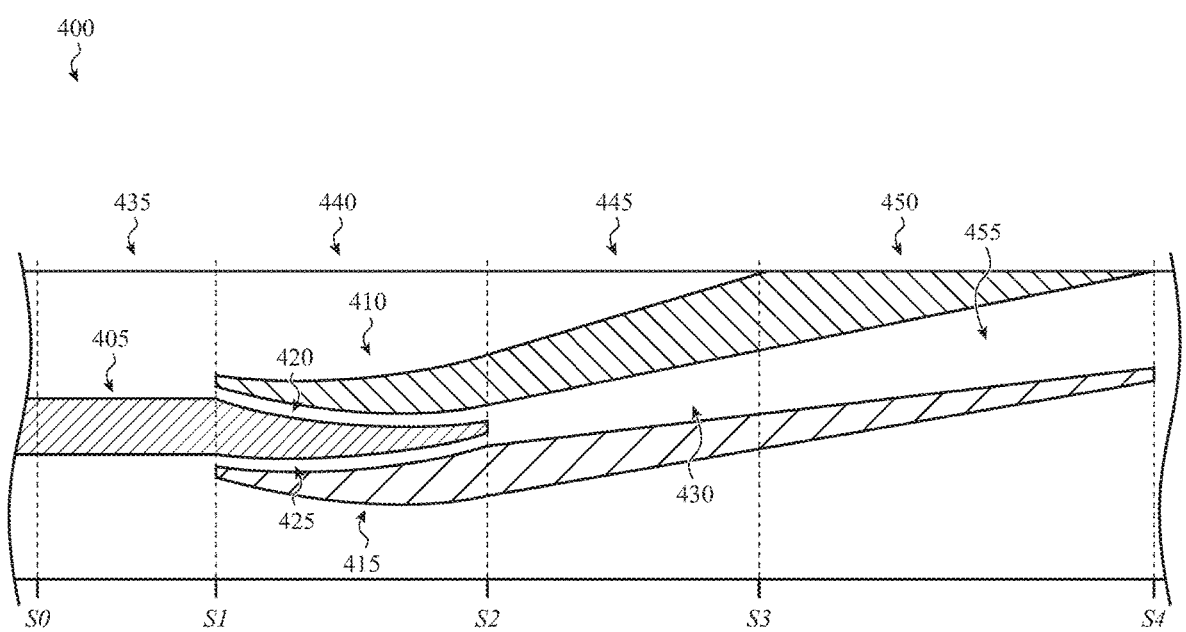
FIG. 4 illustrates another example layout of a waveguide system.

FIG. 4 illustrates an example layout of a waveguide system. In some examples, the waveguide system 400 may include an input waveguide 405, a first waveguide 410, a second waveguide 415, a first gap 420, a second gap 425, a third gap 430, and a fourth gap 455. The input waveguide, the first waveguide, the second waveguide, and the corresponding gaps between the waveguides may be included in the waveguide structure 105 described in FIG. 1. Additionally in FIG. 4, the waveguide system 400 may include a first section 435 extending between S0 and S1, a second section 440 extending between S1 and S2, a third section 445 extending between S2 and S3, and a fourth section 450 extending between S3 and S4. There may be fewer or more sections in the waveguide system as will be discussed in further detail herein with respect to at least FIG. 3. In FIG. 4, the elements are not drawn to scale and may be thicker or thinner than depicted or spaced apart by varying gap widths as described herein at least with respect to FIGS. 2-4. The S0 and the S4 lines as used herein, indicate start and termination points of the first section and the last section, respectively, and are not indicative of termination of the input waveguide, the first waveguide or the second waveguide.

Similar to FIG. 2, the waveguide structure of FIG. 4 includes four sections. As illustrated in FIG. 4, the walls or sides of the input waveguide 405, the first waveguide 410, and the second waveguide 415 may be curved. Although the walls or sides of the waveguides in FIGS. 2 and 3 were depicted as linear, the walls or sides of the waveguides may be nonlinear, curved (as depicted in FIG. 4), or approximately sinusoidal in profile. The widths of the first waveguide 410 and the second waveguide 415 and the gap or gaps therebetween may be selected based at least partially to accommodate asymmetric coupling to the first and second waveguides and while remaining insensitive to wavelength changes over a broad wavelength range. The profile of the first waveguide 410 and the second waveguide 415 and the profile of the gap may vary non-adiabatically so that a designed fraction of power may couple from the symmetric supermode to the antisymmetric supermode while maintaining wavelength change insensitivity over a broad wavelength range.

Similar to FIG. 2, in the first section 435, the input waveguide 405 may depict input light entering the waveguide system 400 and the input waveguide 405 may be configured to reduce optical power loss, thus, as illustrated in FIG. 4, the input waveguide 405 may not be tapered. In the first section 435, the input end of the input waveguide 405 and at S0 may be in the approximate size range of two-three microns and, in some examples, may be approximately 2.6 microns. The received light may include light with multiple wavelengths with a broad range such as in the approximate wavelength range of 800 nanometers to 1600 nanometers. The input waveguide 405 in the first section 435 may be configured so that little to no optical loss may occur in the first section.

The second section 440 of FIG. 4 is similarly configured to FIG. 2 and the waveguide system 400 may include the input waveguide 405, the first waveguide 410, and the second waveguide 415. As depicted in FIG. 4, a second portion of the input waveguide 405 may be spaced apart from the first waveguide 410 by a first gap 420 and the input waveguide 405 may be optically coupled to the first waveguide 410. Similarly, the second portion of the input waveguide 405 may be spaced apart from the second waveguide 415 by a second gap 425 and the input waveguide 405 may be optically coupled to the second waveguide 415 as well.

The input waveguide 405 may be adiabatically tapered so that the local first-order mode of the input waveguide 405 may propagate through the taper while undergoing relatively few mode conversions to higher-order modes. The input waveguide 405 may taper from a consistent width at S1 in the first section 435 to a minimum feature size at S2 in the second section 440. In some examples, the minimum feature size may be less than approximately one micron. Additionally, the input waveguide 405 may be optically coupled to the first waveguide 410 and the second waveguide 415 such that approximately fifty percent of the light from the input waveguide 405 may couple to the first waveguide 410 and approximately fifty percent of the light from the input waveguide 405 may couple to the second waveguide 415. Similar to FIG. 2, in FIG. 4, an ideal optical system with no optical losses is assumed for discussion purposes. In some examples, in a physical optical system built with physical optical components, optical losses may occur throughout the system due to propagation losses, general optical leaking, and so forth, thus less than 50 percent of the optical power may be coupled from the input waveguide 405 to the first and second waveguides, but the coupled optical power may be approximately symmetrically coupled between the first and second waveguides.

As illustrated in the third section 445 and from S2 to S3, the first waveguide 410 may have a different taper than the second waveguide 415. At S3, the width of the first waveguide 410 may be greater than the width of the second waveguide 415. In the third section 445, the first waveguide 410 may be optically coupled to the second waveguide 415 so that a designed fraction of optical power may couple between the two waveguides. In the third section 445, the widths of the first and second waveguides and the gap 430 between the two waveguides may be varied non-adiabatically which may allow asymmetric optical power coupling between the two waveguides. Additionally, the widths of the first and second waveguides and the width of gap 430 may be selected to produce a flat response versus wavelength, or to produce wavelength insensitive coupling between the first waveguide 410 and the second waveguide 415.

In the third section 445 of FIG. 4, the first waveguide 410 and the second waveguide 415 may be coupled to one another and the widths of the first waveguide 410 and the second waveguide 415 and the gap 430 therebetween may be varied non-adiabatically so that a designed fraction may couple from the symmetric supermode to the antisymmetric supermode while maintaining wavelength insensitivity. At S3 of the third section 445, the first waveguide 410 may be at a symmetric supermode and the second waveguide 415 may be at an antisymmetric supermode.

In the fourth section 450 in FIG. 4, the first waveguide 410 and the second waveguide 415 may become optically decoupled from one another. As depicted in the fourth section 450, the gap 455 may gradually increase from S3 to S4 to optically decouple the first waveguide 410 from the second waveguide 415. In the example of FIG. 4, the symmetric supermode and the antisymmetric supermode at S3 may adiabatically evolve into the fundamental modes of the decoupled first waveguide 410 and the second waveguide 415 at S4.

Figure 5A:
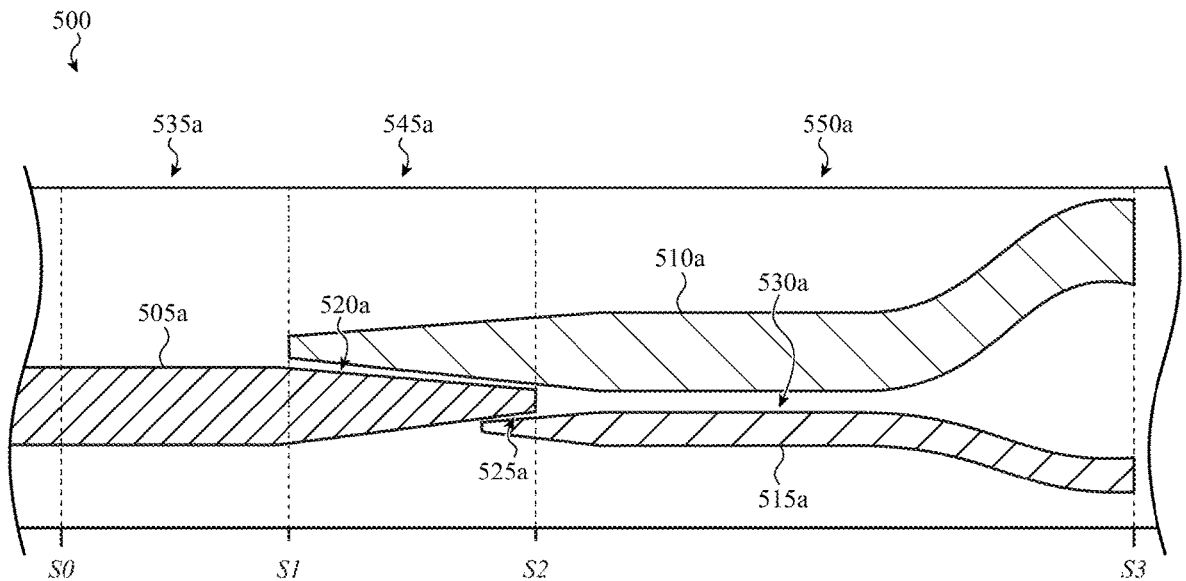
FIG. 5A illustrates another example layout of a waveguide system.

FIG. 5A illustrates another example layout of a waveguide system. The waveguide system 500 is similar to the other waveguide systems described herein, such as with respect to FIGS. 3 and 4. Similarly numbered elements may perform similar functions and thus have the same or similar functionality and/or structure, and so are not discussed at length. The waveguide system 500 includes an input waveguide 505a, a first waveguide 510a, a second waveguide 515a, a first gap 520a, a second gap 525a, and a third gap 530a. Additionally, the waveguide system 500 may include a first section 535a extending between S0 and S1, a second section extending 540a between S1 and S2, and a third section extending 550a between S2 and S3. The S0 and the S3 lines as used herein, indicate start and termination points of the first section and the last section, respectively, and are not indicative of the termination of the input waveguide, the first waveguide or the second waveguide.

In the second section 540a, a starting end of the first waveguide 510a is at approximately the start of the second section 540a (e.g., at line S1), while the starting end of the second waveguide 515a is closer to the end of the second section 540a (e.g., closer to line S2). Positioning an end of the second waveguide 515a later than an end of the first waveguide 505a, relative to the input waveguide 505a may affect the optical power coupling to the second waveguide 515a. In some examples, less optical power may couple to the second waveguide 515a from the input waveguide 505a.

A width of the first gap 520a (that is, a distance between nearest sides of the input waveguide 505a and the first waveguide 510a) may be approximately the same or the same as the second gap 525a (that is, a distance between nearest sides of the input waveguide 505a and the second waveguide 515b). The widths of the gaps affect the power coupling between waveguides; the larger the width, the less power that couples from the input waveguide to the waveguide in question. In some examples, it may be desirable to not introduce larger gaps, which lead to a larger footprint for the waveguide system 500. In some embodiments and as shown in FIG. 5A, the first waveguide 510a may have a narrower width than the second waveguide 515a, which affects what modes of light are supported by the second waveguide 515a. In some embodiments, some of the modes couple to the first waveguide 510a and although the same modes may couple to the second waveguide 515a, they will be converted to a different mode because the second waveguide 515a does not support the specific mode. By controlling the location of the starting end of the second waveguide 515a relative to the first waveguide 510a, the ratio of optical power splitting may be affected and different ratios of optical power splitting may be achieved. For example, the closer the starting ends of the first waveguide 510a and the second waveguide 515a are to one another, the closer the amount of optical power may be coupled into each waveguide. In other examples, the farther apart the starting ends of the first waveguide 510a and the second waveguide 515a are from each other, the greater the disparity of optical power may be coupled into each of the these waveguides relative to one another.

Figure 5B:
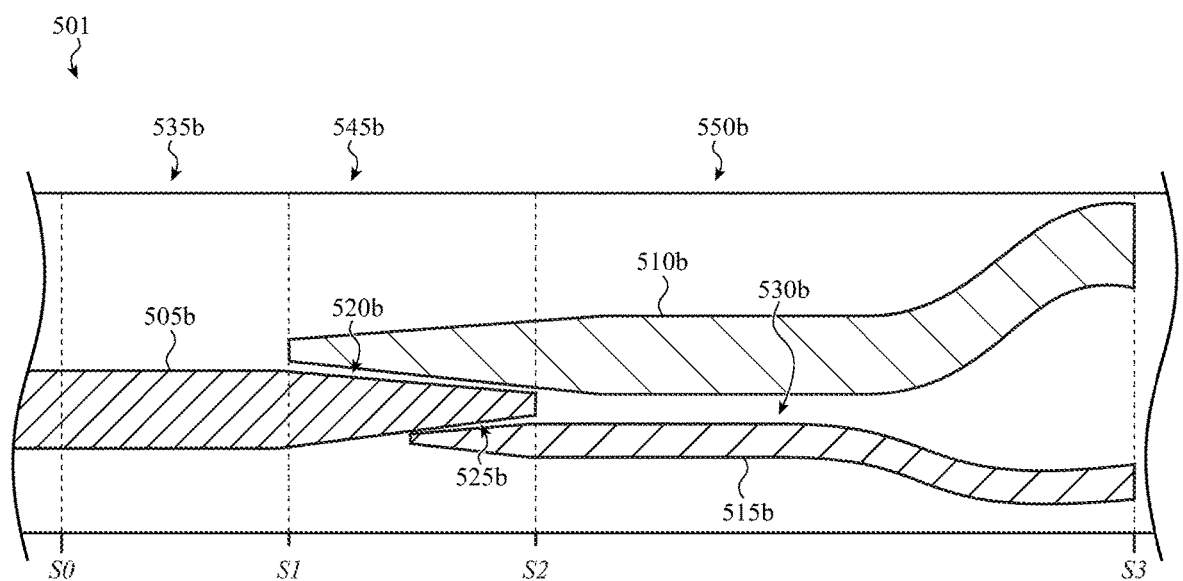
FIG. 5B illustrates another example layout of a waveguide system.

FIG. 5B illustrates another example layout of a waveguide system. The waveguide system 501 is similar to the other waveguide systems described such as waveguide systems 300, 400, and 500. Similarly numbered elements may perform similar functions and thus have the same or similar functionality and/or structure, and so are not discussed at length. The waveguide system 501 includes an input waveguide 505b, a first waveguide 510b, a second waveguide 515b, a first gap 520b, a second gap 525b, and a third gap 530b. The waveguide system 501 may include a first section 535b extending between S0 and S1, a second section 540b extending between S1 and S2, and a third section 550b extending between S2 and S3. The S0 and the S3 lines as used herein, indicate start and termination points of the first section and the last section, respectively, and are not indicative of termination of the input waveguide, the first waveguide or the second waveguide.

Similar to FIG. 5A, in the waveguide system 501, the starting end of the first waveguide 510b is at the start of the second section 545b (e.g., at line S1). However in FIG. 5B, the starting end of the second waveguide 515b is closer to the start of the second section 545b than in FIG. 5A. The second waveguide 515b therefore may receive more optical power coupled in from the input waveguide 505b, than does the second waveguide 515a of FIG. 5A.

Figure 6A:
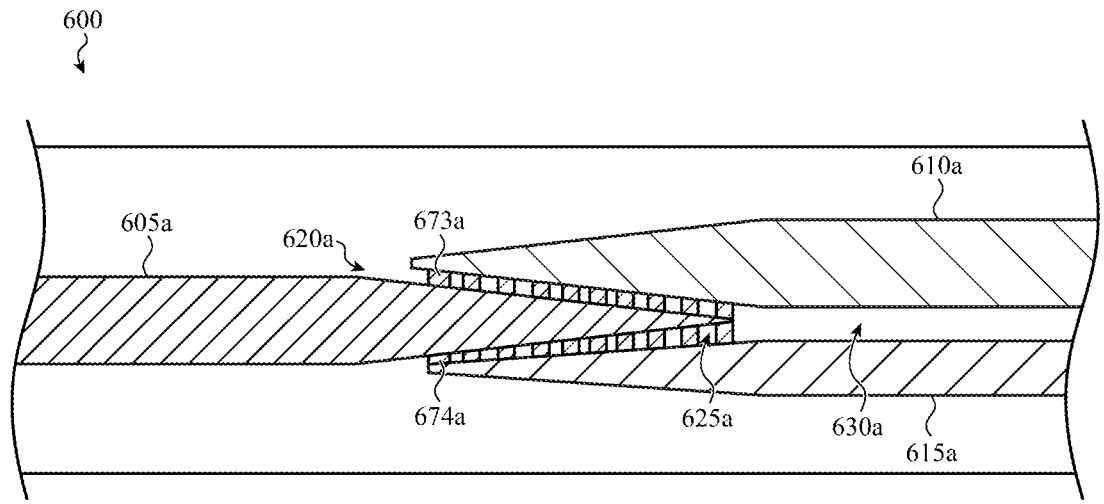
FIG. 6A illustrates another example layout of a waveguide system.

FIG. 6A illustrates another example layout of a waveguide system. Like prior embodiments, the waveguide system 600 includes the input waveguide 605a, a first waveguide 610a, a second waveguide 615a, a first gap 620a defined between the input waveguide and the first waveguide, a second gap 625a defined between the input waveguide and the second waveguide, a third gap 630a defined between the first and second waveguides. Unlike prior-discussed waveguide systems, the waveguide system 600 also includes a first set of coupling elements 673a and a second set of coupling elements 674a. The S0 and the S3 lines as used herein, indicate start and termination points of the first section and the last section, respectively, and are not indicative of termination of the input waveguide, the first waveguide or the second waveguide.

The first set of coupling elements 673a physically connect the input waveguide 605a to the first waveguide 610a, and are typically formed from a material with a refractive index between the refractive indices of silicon and silicon dioxide. In some embodiments, the first set of coupling elements 673a may be formed of silicon. Another way to describe the position of the first set of coupling elements 673a is that they are positioned in the first gap 620a. The first set of coupling elements 673a increase the rate of optical power coupling from the input waveguide 605a to the first waveguide 610a. The first set of coupling elements 673a may be optical sub-micron structures, in other examples they may be larger. In some embodiments, the first set of coupling elements 673a may also increase the amount of optical coupling from the input waveguide to the first waveguide 610a.

Similarly, the second set of coupling elements 674a are positioned in the second gap 625a and may also increase the rate of optical power coupling from the input waveguide 605a to the second waveguide 615a. As with the first set of coupling elements 673a, the second set of coupling elements may physically connect the input waveguide 605a and the second waveguide 615a even though the second set of coupling elements may be made of a different material than the input waveguide 605a and the second waveguide 615a.

The first and second sets of coupling elements 673a, 674a are shown in FIG. 6A as mirror opposites of one another, but may be in an offset position from one another in other examples. Additionally, the first and second sets of coupling elements 673a and 674a are shown as being the same size, but may be any size depending on the desired rate of optical power coupling. Further, any number of coupling elements may be included in the first and second sets of coupling elements 673a and 674a as appropriate for the desired rate of optical power coupling. In some embodiments, the first and second set of coupling elements 673a and 674a may be used to increase the rate of optical coupling when the first gap 620a and the second gap 625a may not be changed or is as narrow as allowed by fabrication constraints and/or application specifications. In some examples, the refractive index of the first and second coupling elements 673a and 674a may between the refractive index of silicon and silicon dioxide, and may depend at least partially, on the desired rate of optical coupling.

By increasing the number of coupling elements in the first and second sets of coupling elements 673a, 674a, the rate of optical power that couples from the input waveguide 605a to the first waveguide 610a and the second waveguide 615a increases. Likewise, if the size of the coupling elements increases, but the number of coupling elements decreases in the first and second sets of coupling elements 673a, 674a, the rate of optical power that couples from the input waveguide 605a to the first waveguide 610a and the second waveguide 615a increases. Generally, the volume of the coupling elements between the input waveguide 605a and the first and second waveguides 610a, 610b, relative to the cladding between the input waveguide 605a and the first and second waveguides 610a, 610b controls the rate of optical power coupling between the input waveguide 605a and the first and second waveguides 610a, 610b.

In some embodiments, the refractive index of the first and second sets of coupling elements 673a and 674a may be between the refractive index of silicon and silicon dioxide, and may depend, at least partially, on the desired rate of optical coupling. The closer the refractive indices of the first and second sets of coupling elements 673a and 674a are to silicon, the more the coupling elements facilitate optical power coupling. Further, the closer the refractive indices of the first and second sets of coupling elements 673a and 674a are to silicon dioxide, the less the coupling elements facilitate optical power coupling.

In some embodiments, the first and second sets of coupling elements 673a and 674a may not abut one or more of the input waveguide 605a, the first waveguide 610a, and/or the second waveguide 615a. For example, the first and second sets of coupling elements 673a and 674a may abut the side of the input waveguide 605a toward the first set of coupling elements 673a and the first waveguide 610a, but not the second waveguide 615a. In this example, there may be faster optical coupling and/or a higher amount of optical coupling between the input waveguide 605a and the first waveguide 610a than between the input waveguide 605 and the second waveguide 615a.

Figure 6B:
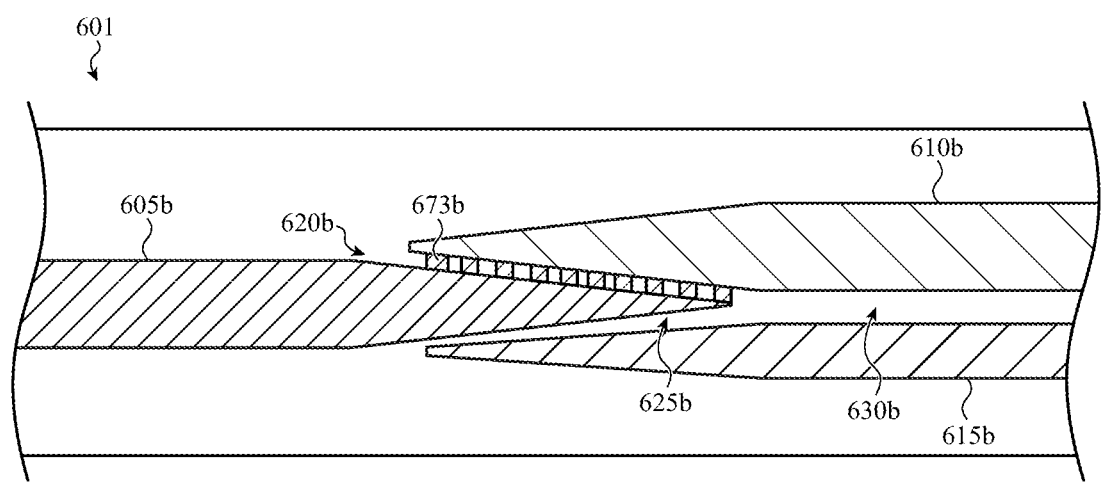
FIG. 6B illustrates another example layout of a waveguide system.

FIG. 6B illustrates another example layout of a waveguide system 601 that includes a set of coupling elements 673b, which function similarly to those described above with respect to FIG. 6A. The waveguide system 601 also includes an input waveguide 605b, first waveguide 610b separated by a gap 620b from the input waveguide, and a second waveguide 615b separated by a gap 625b from the input waveguide. These components function as described above with equivalent components shown in FIGS. 2, 3, and the like, and so are not described in more detail herein.

The first set of coupling elements 673b are positioned in the first gap 620b to facilitate optical coupling from the input waveguide 605b to the first waveguide 610b, but not to the second waveguide 615b. The first set of coupling elements 673b enhance the optical coupling rate between the input waveguide 605b and the first waveguide 610b, which increases the rate of optical coupling when compared with the optical coupling rate to the second waveguide 615b. In some embodiments, the first set of coupling elements 673b may be used when the first gap 620b and the second gap 625b are as narrow as allowed by fabrication constraints or the form factor of the device into which the waveguide system 601 may be incorporated.

Figure 7:
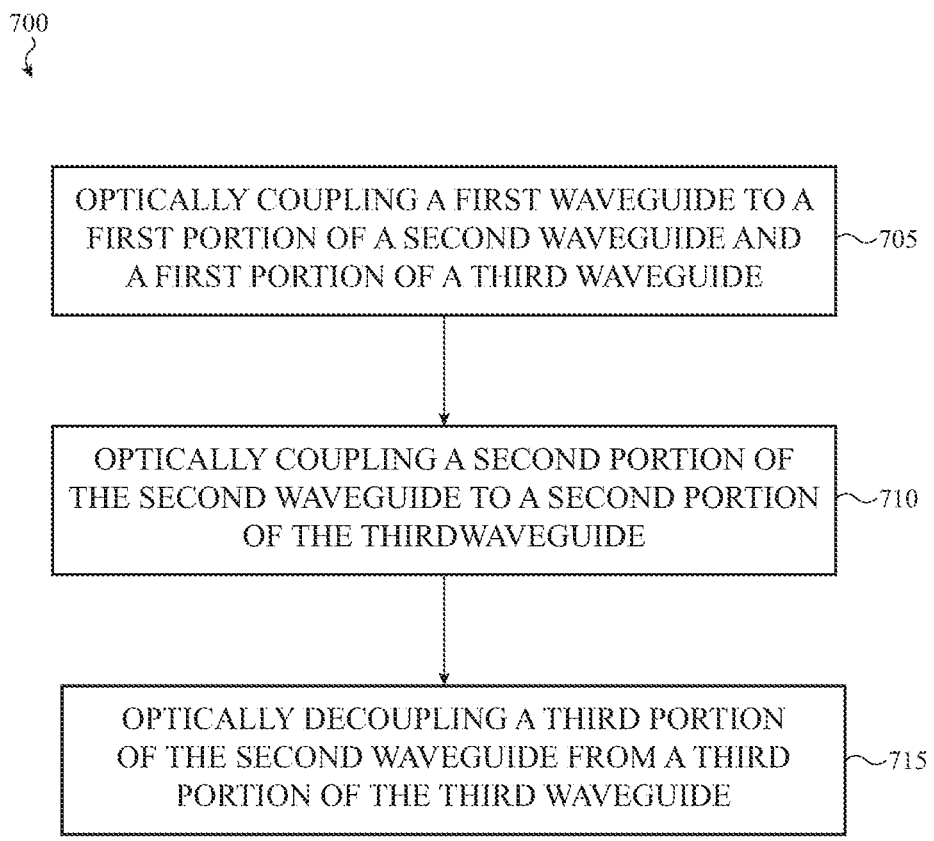
FIG. 7 illustrates an example of a process flow.

FIG. 7 illustrates an example process flow 700. In some examples, the process flow 700 depicted in FIG. 7 may include additional processes not depicted in FIG. 7, or may exclude some of the processes included in FIG. 7. Further, the processes of FIG. 7 are ordered for purposes of discussion, but may, in some examples, be performed in a different order. In the example of FIG. 7, the process flow 700 may include a light guiding device which may include a waveguide structure capable of asymmetric optical power splitting of light.

In FIG. 7 and at 705, a first waveguide may be optically coupled to and located between a first portion of a second waveguide and a first portion of a third waveguide. In some examples, the optical coupling between the first waveguide and the second and third waveguides may be wavelength insensitive. In some examples, the first waveguide may be an input waveguide and the first waveguide may be adiabatically tapered and coupled to the waveguide pair, such that the fundamental mode changes into the symmetric supermode as described herein with respect to at least FIGS. 1-6B.

At 710, a second portion of the second waveguide may be optically coupled to and separated by a first gap, from a second portion of the third waveguide. In some examples, the second portion of the second waveguide and the second portion of the third waveguide may be unequal in width. Further, the widths of the second portions of the second and third waveguides may be varied non-adiabatically to allow for asymmetric optical power splitting between the second and third waveguides as described herein with respect to at least FIGS. 1-6B.

At 715, a third portion of the second waveguide may be optically decoupled from a third portion of the third waveguide. In some examples, the third portion of the second waveguide and the third portion of the third waveguide may be separated by a second gap. Additionally, the symmetric supermode of the second waveguide and the antisymmetric supermode of the third waveguide may change into the fundamental modes of the decoupled second and third waveguides as described herein with respect to at least FIGS. 1-6B.

Figure 8:
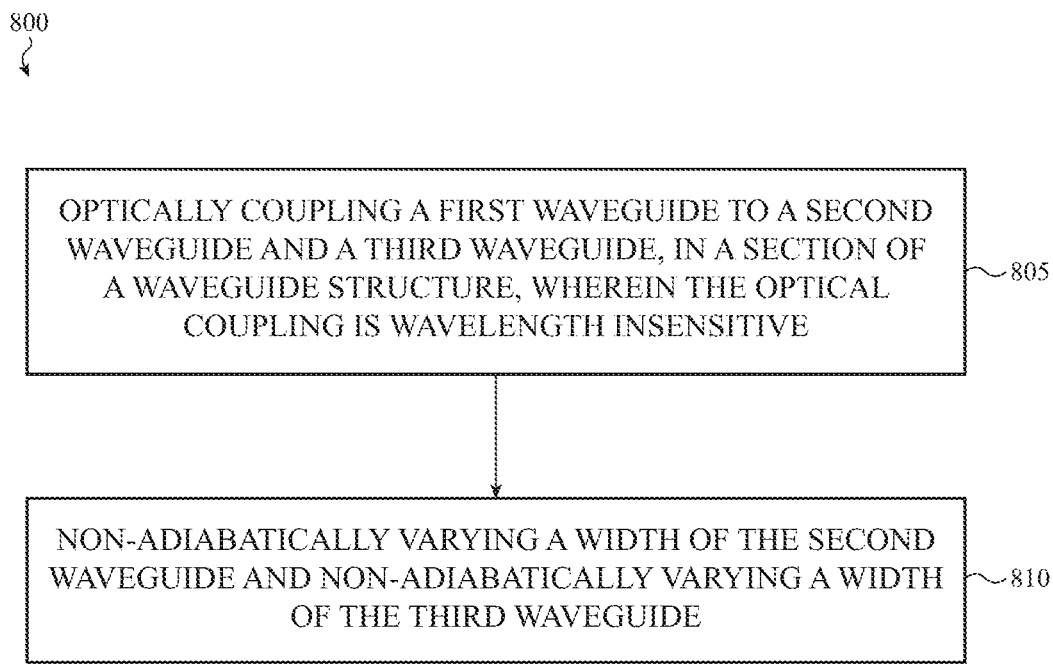
FIG. 8 illustrates an example of a process flow.

FIG. 8 illustrates an example process flow 800. In some examples, the process flow 800 depicted in FIG. 8 may include additional processes not depicted in FIG. 8, or may exclude some of the processes included in FIG. 8. Further, the processes of FIG. 8 are ordered for purposes of discussion, but may, in some examples, be performed in a different order. In the example of FIG. 8, the process flow 800 may include a light guiding device which may include a method for asymmetrically splitting optical power.

In FIG. 8 and at 805, a first waveguide may be optically coupled to both a second waveguide and a third waveguide in a waveguide structure. In some examples, the optical coupling may be wavelength insensitive in that changes in the wavelength of light may not affect the coupling between the first waveguide and the second waveguide and may not affect the coupling between the first waveguide and the third waveguide as described herein with respect to at least FIGS. 1-6B. Further, in some examples, the optical coupling may occur over an approximate wavelength range of 800 nanometers to 1700 nanometers.

At 810, the width of the second waveguide and the width of the third waveguide may be non-adiabatically varied, where a first portion of optical power couples from the first waveguide to the second waveguide and a second portion of optical power couples from the first waveguide to the third waveguide and the first portion and the second portion of optical power may be different as described herein with respect to at least FIGS. 1-6B.

Figure 9:
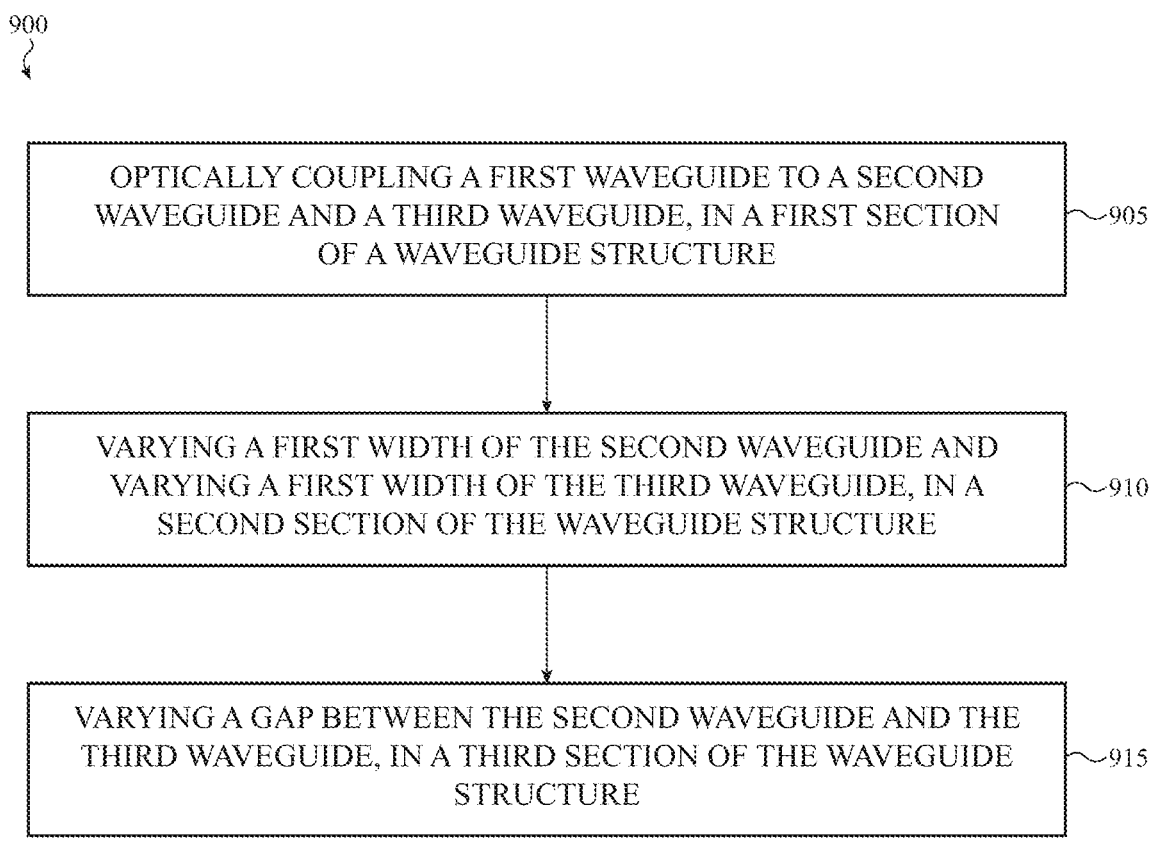
FIG. 9 illustrates an example of a process flow.

FIG. 9 illustrates an example process flow 900. In some examples, the process flow 900 depicted in FIG. 9 may include additional processes not depicted in FIG. 9, or may exclude some of the processes included in FIG. 9. Further, the processes of FIG. 9 are ordered for purposes of discussion, but may, in some examples, be performed in a different order. In the example of FIG. 9, the process flow 900 may include a light guiding device which may include an optical power splitting device.

At 905 and in FIG. 9, a first waveguide may be optically coupled to a second waveguide and a third waveguide, in a first section of a waveguide structure. In some examples, the first waveguide may be an input waveguide and the second waveguide and third waveguide may be output waveguides as described herein with respect to at least FIGS. 1-6B. Further, in some examples, in the first section of the waveguide structure the input waveguide may couple the optical power in a 50:50 split to the second waveguide and the third waveguide.

At 910, a first width of the second waveguide may be varied and a first width of the third waveguide may be varied in a second section of the waveguide structure to optically couple the second waveguide with the third waveguide. In the second section of the waveguide structure, the widths of the coupled waveguides may asymmetrically split the optical power and couple the power such that the symmetric supermode changes to the antisymmetric supermode while maintaining wavelength insensitivity as described herein with respect to at least FIGS. 1-6B.

At 915, a gap may be varied between the second waveguide and the third waveguide, in a third section of the waveguide structure, to optically decouple the second waveguide from the third waveguide. In the third section, the symmetric and antisymmetric supermodes may adiabatically evolve into the fundamental modes of the decoupled second waveguide and third waveguide as described herein with respect to at least FIGS. 1-6B.

In some examples, a tapered input waveguide may be optically coupled to a waveguide pair in a first section of the optical power splitting device, where the optical coupling may be wavelength insensitive. Similarly to FIG. 8 and as described herein, the optical coupling may be wavelength insensitive in that changes in wavelength of the coupled waveguide pair may not affect the coupling between the first waveguide and the second waveguide and may not affect the coupling between the first waveguide and the third waveguide as described herein with respect to at least FIGS. 1-6B.

Additionally, in some examples, a first waveguide of the waveguide pair may be non-adiabatically tapered and optically coupled to the tapered input waveguide and a second waveguide of the waveguide pair may be non-adiabatically tapered and optically coupled to the tapered input waveguide. In some examples, a first quantity of optical power from the tapered input waveguide may be coupled to the first waveguide of the waveguide pair and a second quantity of optical power from the tapered input waveguide may be coupled to the second waveguide of the waveguide pair. Additionally, the first quantity of optical power may be different from the second quantity of optical power and the difference between the first and second quantities of optical power may be based at least in part on a width of the first waveguide of the waveguide pair and a width of the second waveguide of the waveguide pair as described herein with respect to at least FIGS. 1-6B.

The described layouts and configurations of the arbitrary ratio tapping waveguide system in FIGS. 1-9 have been for explanatory purposes. In alternative embodiments, the described embodiments may include a different combination or configuration of components, or may perform additional or alternative functions. The layouts and configurations described herein may be used as part of any optical system and/or electronic device that employs light sources, such as, in a watch, a biometric sensor, a laptop computer, a tablet, or in any other appropriate device.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. An optical system comprising:
an optical splitter comprising:
an input waveguide;
a first waveguide; and
a second waveguide, wherein:
the optical splitter includes a first section in which the input waveguide is positioned between the first waveguide and the second waveguide;
the first waveguide is optically coupled to the first waveguide and the second waveguide in the first section;
the optical splitter includes a second section in which the first waveguide is optically coupled to the second waveguide; and
a width of the first waveguide in the second section is different than a width of the second waveguide in the second section.

2. The optical system of claim 1, wherein:
a width of the input waveguide decreases in the first section in a direction toward the second section.

3. The optical system of claim 2, wherein:
the width of the input waveguide decreases adiabatically in the first section.

4. The optical system of claim 1, wherein:
the width of the first waveguide increases in the first section in a direction toward the second section.

5. The optical system of claim 1, wherein:
the input waveguide is separated from the first waveguide in the first section by a first gap;
the input waveguide is separated from the second waveguide in the first section by a second gap; and
the first gap and the second gap have the same width.

6. The optical system of claim 1, wherein:
the input waveguide is configured to symmetrically couple light between the first waveguide and the second waveguide.

7. The optical system of claim 1, wherein:
the optical splitter includes a third section in which the first waveguide and the second waveguide are optically decoupled.

8. The optical system of claim 7, wherein:
the width of the first waveguide in the second section increases between the first section and the third section; and
the width of the second waveguide in the second section decreases between the first section and the third section.

9. The optical system of claim 8, wherein:
the width of the first waveguide in the second section increases non-adiabatically; and
the width of the second waveguide in the second section decreases non-adiabatically.

10. The optical system of claim 1, wherein:
the input waveguide terminates between the first section and second section.

11. The optical system of claim 1, comprising:
one or more light sources optically connected to the input waveguide, wherein:
the input waveguide receives light generated by the one or more light sources; and
the optical splitter splits light received by the input waveguide between the first waveguide and the second waveguide.

12. An optical system comprising:
an optical splitter comprising:
an input waveguide;
a first waveguide; and
a second waveguide, wherein:
the optical splitter includes a first section in which the input waveguide is optically coupled to the first waveguide and the second waveguide;
the optical splitter includes a second section in which the first waveguide is optically coupled to the second waveguide; and
wherein the first waveguide and the second waveguide are configured in the second section to propagate different modes.

13. The optical system of claim 12, wherein:
the input waveguide is configured to propagate a fundamental mode in the first section.

14. The optical system of claim 13, wherein:
the first waveguide is configured to propagate a symmetric supermode in the second section; and
the second waveguide is configured to propagate an asymmetric supermode in the second section.

15. The optical system of claim 12, wherein:
the first waveguide includes a first starting end positioned in the first section;
the second waveguide includes a second starting end positioned in the first section; and
the first starting end is closer to the second section than the second starting end.

16. The optical system of claim 12, wherein:
a width of the input waveguide decreases adiabatically in the first section.

17. The optical system of claim 12, wherein:
a width of the first waveguide increases in the first section in a direction toward the second section.

18. The optical system of claim 12, wherein:
a width of the second waveguide increases in the first section in a direction toward the second section.

19. The optical system of claim 12, wherein:
a width of the first waveguide in the second section increases non-adiabatically; and
a width of the second waveguide in the second section decreases non-adiabatically.

20. The optical system of claim 12, comprising:
one or more light sources optically connected to the input waveguide, wherein:
the input waveguide receives light generated by the one or more light sources; and
the optical splitter splits light received by the input waveguide between the first waveguide and the second waveguide.

* * * * *